United States Patent
Xiao et al.

(10) Patent No.: US 9,681,208 B2
(45) Date of Patent: Jun. 13, 2017

(54) DATA PROCESSING METHOD, COMMUNICATIONS BOARD AND DEVICE

(71) Applicant: Huawei Technologies Co., Ltd., Shenzhen (CN)

(72) Inventors: Xinhua Xiao, Shenzhen (CN); Yujie Chen, Shenzhen (CN); Jingxin Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 14/725,233

(22) Filed: May 29, 2015

(65) Prior Publication Data

US 2015/0264454 A1 Sep. 17, 2015

Related U.S. Application Data

(63) Continuation of application No. PCT/CN2012/085963, filed on Dec. 5, 2012.

(51) Int. Cl.
 *H04B 10/00* (2013.01)
 *H04Q 11/00* (2006.01)
 *H04J 3/16* (2006.01)

(52) U.S. Cl.
 CPC ........ *H04Q 11/0062* (2013.01); *H04J 3/1658* (2013.01); *H04Q 11/0003* (2013.01); *H04J 2203/0085* (2013.01); *H04Q 2011/0033* (2013.01); *H04Q 2011/0073* (2013.01); *H04Q 2213/1301* (2013.01)

(58) Field of Classification Search
 USPC .............................................. 398/51–54, 98
 See application file for complete search history.

(56) References Cited

U.S. PATENT DOCUMENTS

| | | | |
|---|---|---|---|
| 7,289,537 B1 * | 10/2007 | Devanagondi | H04L 49/109 370/412 |
| 7,602,776 B2 | 10/2009 | Cabrini et al. | |
| 7,782,843 B2 | 8/2010 | Zou et al. | |

(Continued)

FOREIGN PATENT DOCUMENTS

| | | |
|---|---|---|
| CN | 101399751 A | 4/2009 |
| CN | 101610242 A | 12/2009 |

(Continued)

*Primary Examiner* — Agustin Bello
(74) *Attorney, Agent, or Firm* — Slater Matsil, LLP (57) ABSTRACT

Embodiments of the present invention provide a data processing method, a communications board and a device. The method includes: acquiring, by a first communications board, an optical channel data unit ODU data flow; performing, by the first communications board, slicing processing on the ODU data flow according to a fixed frame frequency, so as to obtain various slices, where each slice includes a section of continuous ODU data in the ODU data flow; separately encapsulating, by the first communications board, each slice into an Ethernet frame; and sending, by the first communications board, each Ethernet frame to a time division multiplexing TDM service switching module in an Ethernet switching chip, so that the TDM service switching module sends each Ethernet frame to a second communications board to which a destination MAC address carried in the Ethernet frame directs.

4 Claims, 6 Drawing Sheets

(56) References Cited

U.S. PATENT DOCUMENTS

| | | | | |
|---|---|---|---|---|
| 7,860,085 B2 * | 12/2010 | Garbanati | ............. | H04L 41/042 370/353 |
| 7,940,812 B2 * | 5/2011 | Yu | ........................... | H04J 3/047 370/469 |
| 8,363,670 B2 * | 1/2013 | Ellegard | ............... | H04J 3/1652 370/419 |
| 8,891,526 B2 * | 11/2014 | Du | ......................... | H04L 49/60 370/392 |
| 2001/0050921 A1 * | 12/2001 | Barker | ................. | H04L 49/351 370/465 |
| 2008/0219661 A1 * | 9/2008 | Lanzone | ................ | H04J 3/1611 398/45 |
| 2008/0285550 A1 | 11/2008 | Garbanati et al. | | |
| 2009/0208210 A1 * | 8/2009 | Trojer | ................... | H04J 3/1617 398/58 |
| 2009/0232133 A1 * | 9/2009 | Yu | ......................... | H04J 3/047 370/389 |
| 2010/0135657 A1 * | 6/2010 | Eddleston | ............. | H04J 3/0688 398/44 |
| 2010/0158518 A1 * | 6/2010 | Shin | ...................... | H04J 3/0605 398/45 |
| 2011/0013635 A1 | 1/2011 | Wan et al. | | |
| 2011/0255552 A1 * | 10/2011 | Ellegard | ............... | H04J 3/1652 370/419 |
| 2013/0039658 A1 * | 2/2013 | Abbas | ................... | H04J 3/1652 398/52 |
| 2014/0161463 A1 | 6/2014 | Dong et al. | | |
| 2015/0180803 A1 * | 6/2015 | Li | .......................... | H04L 49/15 370/458 |
| 2015/0264454 A1 * | 9/2015 | Xiao | .................. | H04Q 11/0003 398/52 |

FOREIGN PATENT DOCUMENTS

| | | |
|---|---|---|
| CN | 101621485 A | 1/2010 |
| CN | 101682527 A | 3/2010 |
| CN | 103222237 A | 7/2013 |
| EP | 2249539 A1 | 11/2010 |
| JP | 2008199162 A | 8/2008 |
| JP | 2011010173 A | 1/2011 |
| JP | 2012004690 A | 1/2012 |
| JP | 2012165318 A | 8/2012 |
| RU | 2465732 C2 | 10/2012 |
| WO | 2011095205 A1 | 8/2011 |

* cited by examiner

DATA PROCESSING METHOD, COMMUNICATIONS BOARD AND DEVICE

This application is a continuation and claims the benefit of International Application No. PCT/CN2012/085963, filed on Dec. 5, 2012, which application is hereby incorporated by reference.

TECHNICAL FIELD

The present invention relates to the field of communications technologies, and in particular, to a data processing method, a communications board and a device.

BACKGROUND

When a packet service and a time division multiplexing (Time Division Multiplexing, TDM) service are transmitted in an optical transport network (Optical Transport Network, OTN), if different OTN devices are adopted to transmit the packet service and the TDM service, the packet service and the TDM service need to be switched by using different devices, causing a complex device form and a waste of device resources.

In order to transmit a packet service and a TDM service on one device, a circuit emulation service (Circuit Emulation Service, CES) technology is provided in the prior art, which can encapsulate a TDM service into a packet, and transmit the packet into which the TDM service is encapsulated, together with a packet into which a packet service is encapsulated. However, because transmission paths used are the same when the TDM service and the packet service are transmitted together, when the packet service and the TDM service are switched to another device by using a same device during a transmission process, uncertainty of a switching time required by the packet service is relatively high due to uncertainty of a transmission delay in the packet service; due to a characteristic that the TDM service must be continuously transmitted, the TDM service also needs a large buffer to absorb uncertainty of a switching time, thereby increasing a transmission delay of the TDM service.

SUMMARY

Embodiments of the present invention provide a data processing method, a communications board and a device, which can reduce a transmission delay of a TDM service.

To achieve the foregoing purpose, the following technical solutions are adopted in the present invention:

According to a first aspect, a data processing method is provided and includes:

acquiring, by a first communications board, an optical channel data unit ODU data flow;

performing, by the first communications board, slicing processing on the ODU data flow according to a fixed frame frequency, so as to obtain various slices, where each slice includes a section of continuous ODU data in the ODU data flow;

separately encapsulating, by the first communications board, each slice into an Ethernet frame, where the Ethernet frame carries at least a destination Media Access Control MAC address and a payload area, where the destination MAC address directs to a second communications board and the payload area is used to store the ODU data in the slice and a serial number of the slice; and sending, by the first communications board, each Ethernet frame to a time division multiplexing TDM service switching module in an Ethernet switching chip, so that the TDM service switching module sends each Ethernet frame to the second communications board to which the destination MAC address carried in the Ethernet frame directs.

In a first implementation manner of the first aspect, both an Ethernet interface of the first communications board and an Ethernet interface of the second communications board include at least one Ethernet subinterface, each Ethernet subinterface has a unique MAC address, and the Ethernet subinterfaces of the first communications board and the second communications board are connected to the TDM service switching module in the Ethernet switching chip; and the sending, by the first communications board, each Ethernet frame to a TDM service switching module in an Ethernet switching chip, so that the TDM service switching module sends each Ethernet frame to the second communications board to which the destination MAC address carried in the Ethernet frame directs includes:

sending, by the first communications board, each Ethernet frame to the TDM service switching module in the Ethernet switching chip through the at least one Ethernet subinterface on the first communications board, so that the TDM service switching module sends each Ethernet frame to an Ethernet subinterface of the second communications board to which the destination MAC address carried in the Ethernet frame directs.

According to a second aspect, a data processing method is provided and includes:

receiving, by a second communications board, each Ethernet frame sent by a time division multiplexing TDM service switching module in an Ethernet switching chip, where the Ethernet frame carries at least a destination Media Access Control MAC address and a payload area, where the destination MAC address directs to the second communications board and the payload area is used to store optical channel data unit ODU data in a slice and a serial number of the slice;

decapsulating, by the second communications board, Ethernet frames to obtain the serial numbers of the slices and the ODU data in the slices;

sequentially arranging, by the second communications board according to the serial numbers of the slices, the ODU data in the slices; and restoring, by the second communications board according to a fixed frame frequency, the sequentially arranged ODU data in the slices to an ODU data flow, where the fixed frame frequency is a fixed frame frequency adopted in slicing processing.

In a first implementation manner of the second aspect, an Ethernet interface of the second communications board includes at least one Ethernet subinterface, each Ethernet subinterface has a unique MAC address, and the Ethernet subinterface of the second communications board is connected to the TDM service switching module in the Ethernet switching chip; and the receiving, by a second communications board, each Ethernet frame sent by a TDM service switching module in an Ethernet switching chip includes:

receiving, by the second communications board from the Ethernet subinterface, each Ethernet frame sent by the TDM service switching module in the Ethernet switching chip.

According to a third aspect, a communications board is provided and includes:

an acquiring unit, configured to acquire an optical channel data unit ODU data flow;

a slicing unit, configured to perform slicing processing on the ODU data flow according to a fixed frame frequency, so as to obtain various slices, where each slice includes a section of continuous ODU data in the ODU data flow;

an encapsulating unit, configured to separately encapsulate each slice into an Ethernet frame, where the Ethernet frame carries at least a destination Media Access Control MAC address and a payload area, where the payload area is used to store the ODU data in the slice and a serial number of the slice; and a sending unit, configured to send each Ethernet frame to a time division multiplexing TDM service switching module in an Ethernet switching chip, so that the TDM service switching module sends each Ethernet frame to a second communications board to which the destination MAC address carried in the Ethernet frame directs, where the Ethernet switching chip further includes a packet service switching module that is configured to perform switching processing on a packet service.

In a first implementation manner of the third aspect, an Ethernet interface of the communications board includes at least one Ethernet subinterface, each Ethernet subinterface has a unique MAC address, and the Ethernet subinterface of the communications board is connected to the TDM service switching module in the Ethernet switching chip; and the sending unit is specifically configured to send each Ethernet frame to the TDM service switching module in the Ethernet switching chip through the at least one Ethernet subinterface.

According to a fourth aspect, a communications board is provided and includes:

a receiving unit, configured to receive each Ethernet frame sent by a time division multiplexing TDM service switching module in an Ethernet switching chip, where the Ethernet frame carries at least a destination Media Access Control MAC address and a payload area, where the destination MAC address directs to a second communications board and the payload area is used to store optical channel data unit ODU data in a slice and a serial number of the slice;

a decapsulating unit, configured to decapsulate Ethernet frames to obtain the serial numbers of the slices and the ODU data in the slices;

a sorting unit, configured to sequentially arrange the ODU data in the slices according to the serial numbers of the slices; and a restoring processing unit, configured to restore the sequentially arranged ODU data in the slices to an ODU data flow according to a fixed frame frequency, where the fixed frame frequency is a fixed frame frequency adopted in slicing processing.

In a first implementation manner of the fourth aspect, an Ethernet interface of the communications board includes at least one Ethernet subinterface, each Ethernet subinterface has a unique MAC address, and the Ethernet subinterface of the communications board is connected to the TDM service switching module in the Ethernet switching chip; and the receiving unit is specifically configured to receive, from the Ethernet subinterface, each Ethernet frame sent by the TDM service switching module in the Ethernet switching chip.

According to a fifth aspect, a data switching device is provided and includes:

a packet service board that has an Ethernet interface;

a first communications board and a second communications board, each of which has an Ethernet interface; and an Ethernet switching chip that includes a packet service switching module and a time division multiplexing TDM service switching module, where the packet service switching module is connected to the Ethernet interface of the packet service board, and the TDM service switching module is connected to the Ethernet interfaces of the first communications board and the second communications board; where the packet service board is configured to send packet service data to the packet service switching module, or receive packet service data sent by the packet service switching module, or perform processing on the packet service data;

the packet service switching module in the Ethernet switching chip is configured to receive the packet service data sent by the packet service board, and send the packet service data to a target packet service board;

the first communications board is configured to acquire an optical channel data unit ODU data flow; perform slicing processing on the ODU data flow according to a fixed frame frequency, so as to obtain various slices, where each slice includes a section of continuous ODU data in the ODU data flow; separately encapsulate each slice into an Ethernet frame, where the Ethernet frame carries at least a destination Media Access Control MAC address and a payload area, where the destination MAC address directs to the second communications board and the payload area is used to store the ODU data in the slice and a serial number of the slice; and send each Ethernet frame to the TDM service switching module;

the TDM service switching module in the Ethernet switching chip is configured to receive each Ethernet frame sent by the first communications board and send each Ethernet frame to the second communications board to which the destination MAC address carried in the Ethernet frame directs; and the second communications board is configured to receive each Ethernet frame sent by the TDM service switching module in the Ethernet switching chip; decapsulate Ethernet frames to obtain the serial numbers of the slices and the ODU data in the slices; sequentially arrange the ODU data in the slices according to the serial numbers of the slices; and restore the sequentially arranged ODU data in the slices to an ODU data flow according to a fixed frame frequency, where the fixed frame frequency is a fixed frame frequency adopted in slicing processing.

With reference to the fifth aspect, in a first implementation manner of the fifth aspect, the Ethernet interface of the first communications board includes at least one Ethernet subinterface, each Ethernet subinterface has a unique MAC address, and the Ethernet subinterface is connected to the TDM service switching module in the Ethernet switching chip; and the first communications board is specifically configured to send each Ethernet frame to the TDM service switching module in the Ethernet switching chip through the at least one Ethernet subinterface.

With reference to the fifth aspect, in a second implementation manner of the fifth aspect, the Ethernet interface of the second communications board includes at least one Ethernet subinterface, each Ethernet subinterface has a unique MAC address, and the Ethernet subinterface is connected to the TDM service switching module in the Ethernet switching chip; and the second communications board is specifically configured to receive, from the Ethernet subinterface, each Ethernet frame sent by the TDM service switching module in the Ethernet switching chip.

With reference to the fifth aspect, in a third implementation manner of the fifth aspect, the first communications board is a TDM service board that has a TDM service processing module or an OTN line board that has a TDM service processing module; and the second communications board is a TDM service board that has a TDM service processing module or an OTN line board that has a TDM service processing module.

According to a sixth aspect, a communications board is provided and includes:

a receiver, configured to acquire an optical channel data unit ODU data flow;

a processor, configured to perform slicing processing on the ODU data flow according to a fixed frame frequency, so as to obtain various slices, where each slice includes a section of continuous ODU data in the ODU data flow; where the processor is further configured to separately encapsulate each slice into an Ethernet frame, where the Ethernet frame carries at least a destination Media Access Control MAC address and a payload area, where the destination MAC address directs to a second communications board and the payload area is used to store the ODU data in the slice and a serial number of the slice; and a transmitter, configured to send each Ethernet frame to a time division multiplexing TDM service switching module in an Ethernet switching chip, so that the TDM service switching module sends each Ethernet frame to the second communications board to which the destination MAC address carried in the Ethernet frame directs, where the Ethernet switching chip further includes a packet service switching module that is configured to perform switching processing on a packet service.

With reference to the sixth aspect, in a first implementation manner of the sixth aspect, an Ethernet interface of the communications board includes at least one Ethernet subinterface, each Ethernet subinterface has a unique MAC address, and the Ethernet subinterface of the communications board is connected to the TDM service switching module in the Ethernet switching chip; and the transmitter is specifically configured to send each Ethernet frame to the TDM service switching module in the Ethernet switching chip through the at least one Ethernet subinterface.

With reference to the sixth aspect, in a second implementation manner of the sixth aspect, the communications board is a TDM service board that has a TDM service processing module or an OTN line board that has a TDM service processing module.

According to a seventh aspect, a communications board is provided and includes:

a receiver, configured to receive each Ethernet frame sent by a time division multiplexing TDM service switching module in an Ethernet switching chip, where the Ethernet frame carries at least a destination Media Access Control MAC address and a payload area, where the destination MAC address directs to a second communications board and the payload area is used to store optical channel data unit ODU data in a slice and a serial number of the slice; and a processor, configured to decapsulate Ethernet frames to obtain the serial numbers of the slices and the ODU data in the slices; where the processor is further configured to sequentially arrange the ODU data in the slices according to the serial numbers of the slices; and the processor is further configured to restore the sequentially arranged ODU data in the slices to an ODU data flow according to a fixed frame frequency, where the fixed frame frequency is a fixed frame frequency adopted in slicing processing.

With reference to the seventh aspect, in a first implementation manner of the seventh aspect, an Ethernet interface of the communications board includes at least one Ethernet subinterface, each Ethernet subinterface has a unique MAC address, and the Ethernet subinterface of the communications board is connected to the TDM service switching module in the Ethernet switching chip; and the receiver is specifically configured to receive, from the Ethernet subinterface, each Ethernet frame sent by the TDM service switching module in the Ethernet switching chip.

With reference to the seventh aspect, in a second implementation manner of the seventh aspect, the communications board is a TDM service board that has a TDM service processing module or an OTN line board that has a TDM service processing module.

In this embodiment, after acquiring an ODU data flow, a first communications board performs slicing processing on the ODU data flow according to a fixed frame frequency, so as to obtain various slices; separately encapsulates each slice into an Ethernet frame; and sends the Ethernet frame to a TDM service switching module in an Ethernet switching chip, so that the TDM service switching module can send each Ethernet frame to a second communications board to which a destination MAC address carried in the Ethernet frame directs. After receiving the Ethernet frame, the second communications board can obtain ODU data by means of restoration, thereby completing switching of the ODU data between the first communications board and the second communications board.

Because the ODU data flow carries TDM service data, switching of the ODU data flow from the first communications board to the second communications board is independently performed by using the TDM service switching module in the Ethernet switching chip, and switching of a packet service is performed by using a packet service switching module in the Ethernet switching chip. Because a transmission delay of a TDM service is relatively small, when the TDM service switching module in the Ethernet switching chip switches the TDM service data to the second communications board, the TDM service is not affected by a transmission delay of the packet service. In this way, when the packet service and the TDM service are switched on a same switching device, time required for switching the TDM service is shortened and the transmission delay of the TDM service is further decreased.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a data processing method, which can reduce time required for switching a TDM service and further decreases a transmission delay of the TDM service when a packet service and the TDM service are switched in a same switching device.

The switching device has at least a packet service board that is configured to process a packet service, a first communications board, an Ethernet switching chip, and a second communications board.

The first communications board may include: a TDM service board that has a TDM service processing module or an OTN line board that has a TDM service processing module, where the TDM service processing module is configured to process a TDM service.

The second communications board may include: a TDM service board that has a TDM service processing module or an OTN line board that has a TDM service processing module, where the TDM service processing module is configured to process a TDM service.

Figure 1:
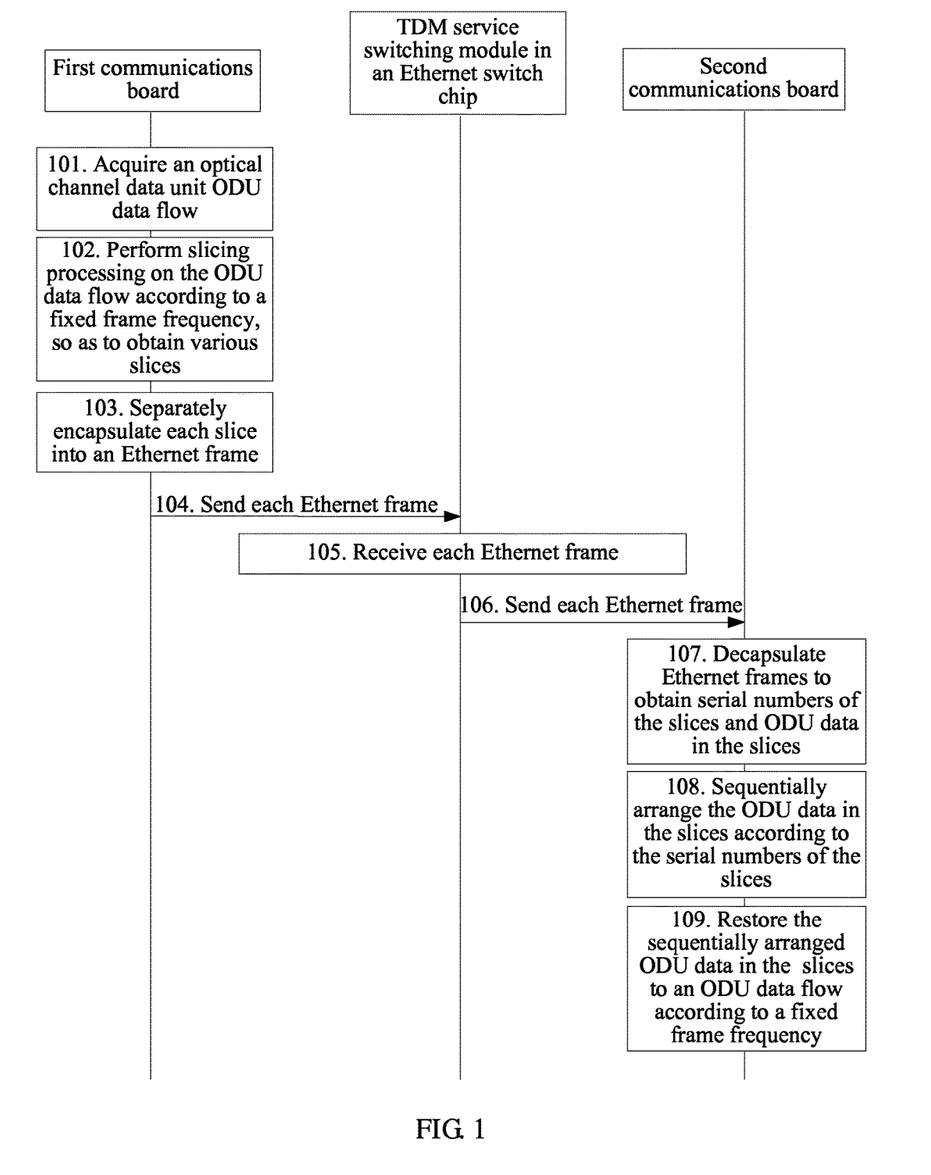
FIG. 1 is a schematic flowchart of a data processing method according to an embodiment of the present invention.

An embodiment of the present invention provides a data processing method, which is used to implement switching of a TDM service on the switching device. As shown in FIG. 1, the method includes the following steps:

101. A first communications board acquires an optical channel data unit (Optical channel Data Unit, ODU) data flow.

For example, if the first communications board is a TDM service board, an implementation manner of acquiring the ODU data flow is: after receiving TDM service data, the TDM service board encapsulates the TDM service data into an ODU, so as to obtain multiple pieces of ODU data, where a data flow formed by the multiple pieces of ODU data is the ODU data flow. A type of the TDM service data is not limited.

For a manner of encapsulating the TDM service data into an ODU, so as to obtain multiple pieces of ODU data, reference may be made to the prior art.

For another example, if the first communications board is an OTN line board, an implementation manner of acquiring the ODU data flow is: the OTN line board may receive, through an optical interface of the OTN line board, an optical signal from another device, that is, a device in which the OTN line board is located receives an optical signal from another device; then the OTN line board performs FEC processing on data in the optical signal, performs a deframing operation to obtain higher order ODU data by means of restoration, and performs a demultiplexing operation on the higher order ODU data to obtain multiple pieces of lower order ODU data, where a data flow formed by the multiple pieces of lower order ODU data is the ODU data flow.

For an implementation process of the FEC processing, the deframing operation, and the demultiplexing operation, reference may be all made to related existing technologies, and details are not described herein again.

102. The first communications board performs slicing processing on the ODU data flow according to a fixed frame frequency, so as to obtain various slices, where each slice includes a section of continuous ODU data in the ODU data flow.

The fixed frame frequency may be any value selected from 40.6 thousand times per second to 178.6 thousand times per second. For example, in order to take into account both clock performance and expansibility of encapsulation, the fixed frame frequency may be set to a value of 116.9 thousand times per second, that is, slicing processing is performed on the ODU data 116.9 thousand times per second, so as to obtain multiple slices.

A value range of the fixed frame frequency may be determined according to a size of bandwidth occupied by the ODU data in the slice and a size of bandwidth supported by an Ethernet interface of the first communications board.

For example, when a rate of the Ethernet interface of the first communications board is 10 GE, and maximum bandwidth supported is 10 Gbps (coding efficiency is not considered), the Ethernet interface is evenly divided into 20 subinterfaces in which bandwidth of each subinterface is 500 Mbps, and maximum bandwidth occupied by the ODU data in the slice is 1.31 Gbps. The ODU data in the slice needs to occupy 3 subinterfaces for transmission, and actually occupied bandwidth of each subinterface is 1.31 Gbps/3=437 Mbps. Then, a minimum value of the fixed frequency is 500 Mbps/(1538 Byte*8)=40.6 thousand times per second, where 1538 bytes is obtained by using the following formula: a maximum Ethernet frame length+bytes occupied by an interframe gap+bytes occupied by a preamble/start of frame delimiter, where the maximum Ethernet frame length occupies 1518 Bytes, and the interframe gap and the preamble/start of frame delimiter occupy 20 Bytes. A maximum value of the fixed frame frequency is as follows: when the Ethernet frame length is 330 Bytes, an obtained frame frequency value is 500 Mbps/(350 Byte*8)=178.6 thousand times per second, where, among the 350 Bytes, the Ethernet frame length occupies 330 Bytes and the interframe gap and the preamble/start of frame delimiter occupy 20 Bytes. In this case, bandwidth occupied by a payload area (the payload area is used to carry the ODU data) is exactly 437 Mbps.

103. The first communications board separately encapsulates each slice into an Ethernet frame.

The Ethernet frame carries at least a destination Media Access Control (Media Access Control, MAC) address and a payload area.

For example, a standard format of an Ethernet frame is shown in the following Table 1:

TABLE 1

| Interframe gap | Preamble/Start of frame delimiter | Destination address | Source address | Payload area | Frame check sequence |
| --- | --- | --- | --- | --- | --- |

The destination address is used to store a destination MAC address, and the destination MAC address directs to a second communications board. The source address is used to store a MAC address of the first communications board. For selection and functions of parameters such as the interframe gap, the preamble/start of frame delimiter, and the frame check sequence, reference may be made to the prior art.

A standard format of the payload area is shown in the following Table 2:

TABLE 2

| Payload header | Payload data | Pad |
| --- | --- | --- |

The payload area is used to store the ODU data in the slice and a serial number of the slice. Specifically, the payload data part of the payload area is used to store the ODU data in the slice, and the payload header part is used to store the serial number of the slice.

The payload area may use a fixed-length form, and may also use a variable-length form. If the payload area uses the fixed-length form, a payload area of a fixed length may be obtained by adding the pad part to payload data of different lengths; if the payload area uses the variable-length form, the pad is not required.

The payload header part may further store ODU clock information, where the ODU clock information may specifically be a difference between a clock frequency used by the ODU data in the slice and a system clock frequency of a device in which the first communications board is located. The difference may enable the second communications board to obtain, by means of restoration and after receiving the Ethernet frame, a clock used by the ODU data, where the clock used by the ODU data is used when the ODU data is sent.

104. The first communications board sends each Ethernet frame to a TDM service switching module in an Ethernet switching chip, so that the TDM service switching module sends each Ethernet frame to a second communications board to which a destination MAC address carried in the Ethernet frame directs.

Further, both an Ethernet interface of the first communications board and an Ethernet interface of the second communications board include at least one Ethernet subinterface, each Ethernet subinterface has a unique MAC address, and the Ethernet subinterfaces of the first communications board and the second communications board are connected to the TDM service switching module in the Ethernet switching chip.

For example, when maximum bandwidth supported by an Ethernet interface of the first communications board is 10 GE, the Ethernet interface of the first communications board may be evenly divided into 20 subinterfaces, and bandwidth supported by each subinterface is 500 Mbps. In actual application, each Ethernet subinterface may obtain a unique MAC address by means of statistic configuration. Likewise, similar processing is performed on the second communications board.

Ethernet subinterfaces of the first communications board and the second communications board are connected to the TDM service switching module in the Ethernet switching chip, so that the first communications board and the second communications board can communicate with the TDM service switching module in the Ethernet switching chip through their respective Ethernet subinterfaces.

In step 104, that the first communications board sends each Ethernet frame to a TDM service switching module in an Ethernet switching chip, so that the TDM service switching module sends each Ethernet frame to a second communications board to which a destination MAC address carried in the Ethernet frame directs may specifically be replaced by the following manner for implementation:

the first communications board sends each Ethernet frame to the TDM service switching module in the Ethernet switching chip through the at least one Ethernet subinterface on the first communications board, so that the TDM service switching module sends each Ethernet frame to an Ethernet subinterface of the second communications board to which the destination MAC address carried in the Ethernet frame directs.

105. The TDM service switching module in the Ethernet switching chip receives each Ethernet frame sent by the first communications board.

The Ethernet switching chip includes a packet service switching module and a TDM service switching module.

In actual application, an existing Ethernet switching chip may be logically divided into a packet service switching module and a TDM service switching module. The packet service switching module is a module that is used to process a packet service and is originally located in the Ethernet switching chip. The packet service switching module is connected to an Ethernet interface of the packet service board, and is used to process a packet service from the packet service board. The TDM service switching module is a newly added function module, which needs to connect to Ethernet interfaces of the first communications board and the second communications board, and is used to process a TDM service.

106. The TDM service switching module in the Ethernet switching chip sends each Ethernet frame to the second communications board to which the destination MAC address carried in the Ethernet frame directs.

It should be noted that, when each Ethernet interface of the first communications board and the second communications board includes multiple subinterfaces, implementation of step 105 may also specifically be: the TDM service switching module receives each Ethernet frame sent by an Ethernet subinterface of the first communications board; and implementation of step 106 may also specifically be: each Ethernet frame is sent to an Ethernet subinterface of the second communications board to which the destination MAC address carried in the Ethernet frame directs.

For example, when the first communications board needs to send an Ethernet frame from Ethernet subinterface 2 of the first communications board to Ethernet subinterface 6 of the second communications board, the destination MAC address carried in the Ethernet frame directs to Ethernet subinterface 6 of the second communications board. The TDM service switching module receives each Ethernet frame sent by Ethernet subinterface 2 of the first communications board, and sends each Ethernet frame to Ethernet subinterface 6 of the second communications board to which the destination MAC address carried in the Ethernet frame directs.

107. The second communications board receives Ethernet frames sent by the TDM service switching module in the Ethernet switching chip, and decapsulates Ethernet frames to obtain serial numbers of the slices and ODU data in the slices.

If the Ethernet frame carries ODU clock information, the ODU clock information is also obtained after the Ethernet frames are decapsulated.

108. The second communications board sequentially arranges the ODU data in the slices according to the serial numbers of the slices.

109. The second communications board restores the sequentially arranged ODU data in the slices to an ODU data flow according to a fixed frame frequency, where the fixed frame frequency is a fixed frame frequency adopted in slicing processing.

If the ODU clock information is obtained in step 108, a clock used in the ODU data in each slice may further be restored according to the ODU clock information in each slice.

The ODU clock information is a difference between a clock frequency used by the ODU data in the slice and a system clock frequency of a device in which the first communications board is located. Both the first communications board and the second communications board are located on a same device. Therefore, the second communications board may restore, by using the difference and the system clock frequency of the device, the clock frequency used by the ODU data in the slice.

It should be noted that, after the second communications board obtains the ODU data by means of restoration, different processing is subsequently performed according to different types of the second communications board.

For example, if the second communications board is a TDM service board, the TDM service board performs related TDM service processing by using TDM service data carried in the ODU data.

If the second communications board is an OTN line board, the OTN line board performs a multiplexing operation on each piece of ODU data in the ODU data flow that is obtained by means of restoration, so as to obtain each piece of higher order ODU data; then performs a framing operation and FEC processing on each piece of higher order ODU data, so as to obtain each optical signal; and sends, according to a clock used by the ODU data, the optical signal to another device through an optical interface of the OTN line board, that is, a device in which the OTN line board is located sends an optical signal that carries the ODU data to the another device according to the clock used by the ODU data.

A switching device provided in this embodiment of the present invention may further be used to implement switching of the packet service, which is specifically as follows: the packet service switching module in the Ethernet switching chip is connected to the Ethernet interface of the packet service board. The packet service board may send packet service data to the packet service switching module, and the packet service switching module receives the packet service data sent by the packet service board and sends the packet service data to a target packet service board, thereby completing the switching of the packer service.

In this embodiment of the present invention, a process in which the switching device is used to perform switching processing on the packet service is the same as switching processing on a packet service in the prior art, and details are not described herein again.

According to the method provided in this embodiment, after acquiring an ODU data flow, a first communications board performs slicing processing on the ODU data flow according to a fixed frame frequency, so as to obtain various slices; separately encapsulates each slice into an Ethernet frame; and sends the Ethernet frame to a TDM service switching module in an Ethernet switching chip, so that the TDM service switching module can send each Ethernet frame to a second communications board to which a destination MAC address carried in the Ethernet frame directs. After receiving the Ethernet frame, the second communications board can obtain ODU data by means of restoration, thereby completing switching of the ODU data between the first communications board and the second communications board.

Because the ODU data flow carries TDM service data, switching of the ODU data flow from the first communications board to the second communications board is independently performed by using the TDM service switching module in the Ethernet switching chip, and switching of a packet service is performed by using a packet service switching module in the Ethernet switching chip. Because a transmission delay of a TDM service is relatively small, when the TDM service switching module in the Ethernet switching chip switches the TDM service data to the second communications board, the TDM service is not affected by a transmission delay of the packet service. In this way, time required for switching the TDM service is shortened and the transmission delay of the TDM service is further decreased when the packet service and the TDM service are switched on a same switching device.

An embodiment of the present invention provides a communications board, where the communications board has an Ethernet interface 40, and the communications board is a TDM service board that has a TDM service processing module or an OTN line board that has a TDM service processing module.

Figure 2:
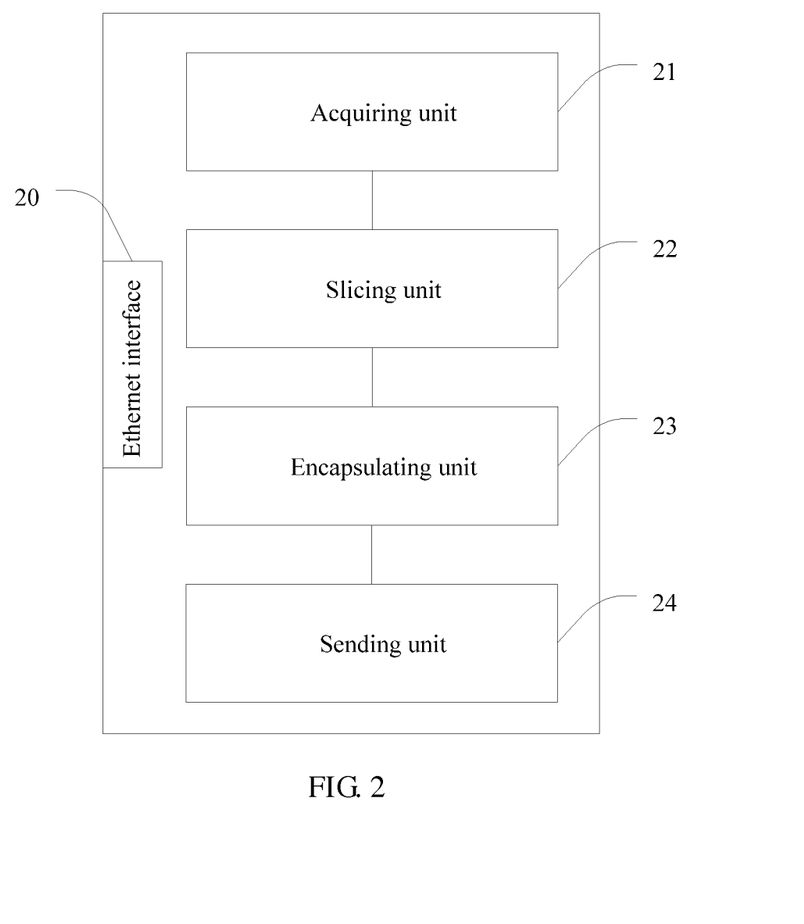
FIG. 2 is a first schematic structural diagram of a communications board according to an embodiment of the present invention.

As shown in FIG. 2, the communications board includes:

an acquiring unit 21, configured to acquire an ODU data flow;

a slicing unit 22, configured to perform slicing processing on the ODU data flow according to a fixed frame frequency, so as to obtain various slices, where each slice includes a section of continuous ODU data in the ODU data flow;

an encapsulating unit 23, configured to separately encapsulate each slice into an Ethernet frame, where the Ethernet frame carries at least a destination MAC address and a payload area, where the payload area is used to store the ODU data in the slice and a serial number of the slice; and for detailed description of the Ethernet frame and the payload area in the Ethernet frame, reference may be made to the foregoing step 103; and a sending unit 24, configured to send each Ethernet frame to a TDM service switching module in an Ethernet switching chip, so that the TDM service switching module sends each Ethernet frame to a second communications board to which the destination MAC address carried in the Ethernet frame directs, where the Ethernet switching chip further includes a packet service switching module that is configured to perform switching processing on a packet service.

In this embodiment, after acquiring an ODU data flow, a communications board performs slicing processing on the ODU data flow according to a fixed frame frequency, so as to obtain various slices; separately encapsulates each slice into an Ethernet frame; and sends the Ethernet frame to a TDM service switching module in an Ethernet switching chip. Therefore, the TDM service switching module can send each Ethernet frame to a second communications board to which a destination MAC address carried in the Ethernet frame directs, so that after receiving the Ethernet frame, the second communications board can obtain ODU data by means of restoration, thereby completing switching of the ODU data from the communications board to the Ethernet switching chip.

Figure 2A:
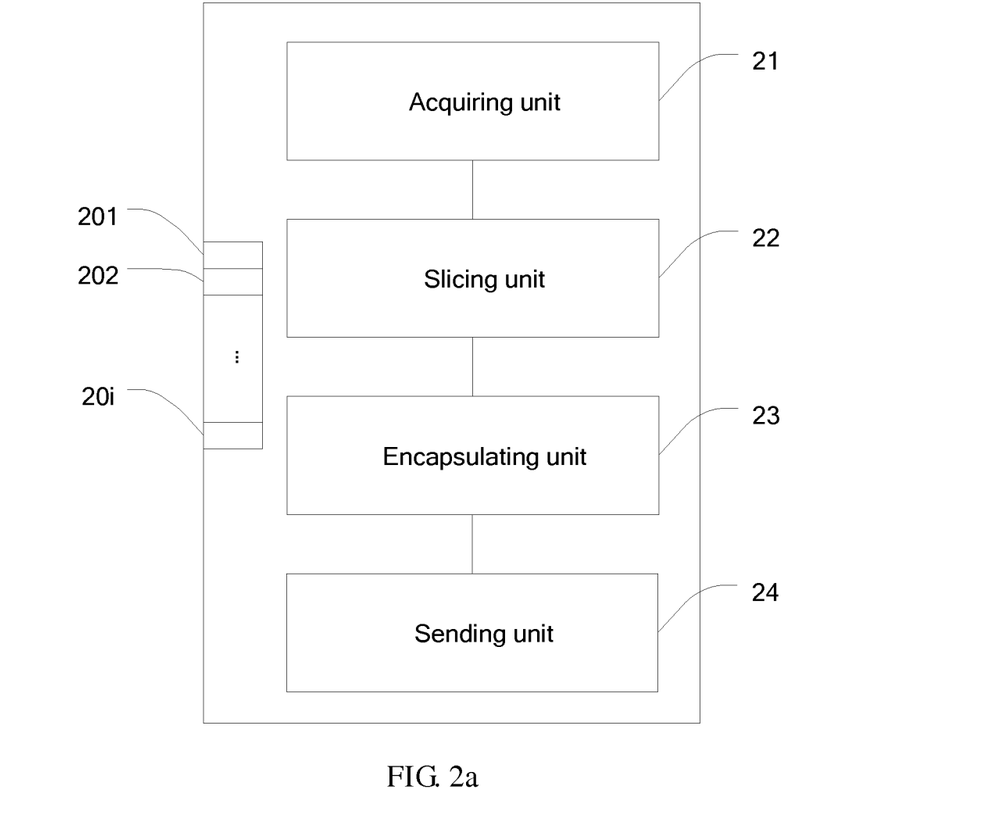
FIG. 2a is a second schematic structural diagram of a communications board according to an embodiment of the present invention.

Further, as shown in FIG. 2a, an Ethernet interface of the communications board includes at least one Ethernet subinterface (Ethernet subinterfaces 201 and 202-20i in FIG. 2a, where i≥1 and i is a positive integer), each Ethernet subinterface has a unique MAC address, and the Ethernet subinterface of the communications board is connected to the TDM service switching module in the Ethernet switching chip.

The sending unit is specifically configured to send each Ethernet frame to the TDM service switching module in the Ethernet switching chip through the at least one Ethernet subinterface.

For the communications board shown in FIG. 2, reference may be made to related description of the first communications board in the method shown in FIG. 1.

An embodiment of the present invention further provides a communications board, where the communications board has an Ethernet interface 60, and the communications board is a TDM service board that has a TDM service processing module or an OTN line board that has a TDM service processing module.

Figure 3:
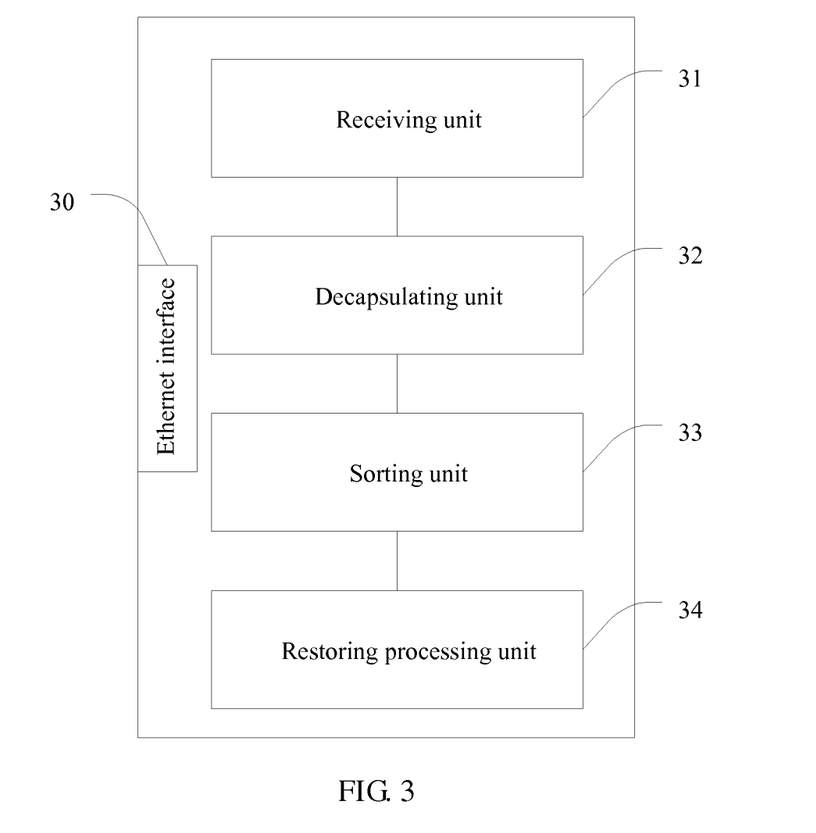
FIG. 3 is a third schematic structural diagram of a communications board according to an embodiment of the present invention.

As shown in FIG. 3, the communications board includes:

a receiving unit 31, configured to receive each Ethernet frame sent by a TDM service switching module in an Ethernet switching chip, where the Ethernet frame carries at least a destination MAC address and a payload area, where the destination MAC address directs to a second communications board and the payload area is used to store ODU data in a slice and a serial number of the slice; and for detailed description of the Ethernet frame and the payload area in the Ethernet frame, reference may be made to the foregoing step 103;

a decapsulating unit 32, configured to decapsulate Ethernet frames to obtain the serial numbers of the slices and the ODU data in the slices;

a sorting unit 33, configured to sequentially arrange the ODU data in the slices according to the serial numbers of the slices; and a restoring processing unit 34, configured to restore the sequentially arranged ODU data in the slices to an ODU data flow according to a fixed frame frequency, where the fixed frame frequency is a fixed frame frequency adopted in slicing processing.

In this embodiment, after receiving an Ethernet frame sent by a TDM service switching module in an Ethernet switching chip, a communications board decapsulates Ethernet frames to obtain serial numbers of the slices and ODU data in the slices, sequentially arranges the ODU data in the slices according to the serial numbers of the slices, and then restores the sequentially arranged ODU data in the slices to an ODU data flow according to a fixed frame frequency, thereby completing switching of the ODU data from the Ethernet switching chip to the communications board.

Figure 3A:
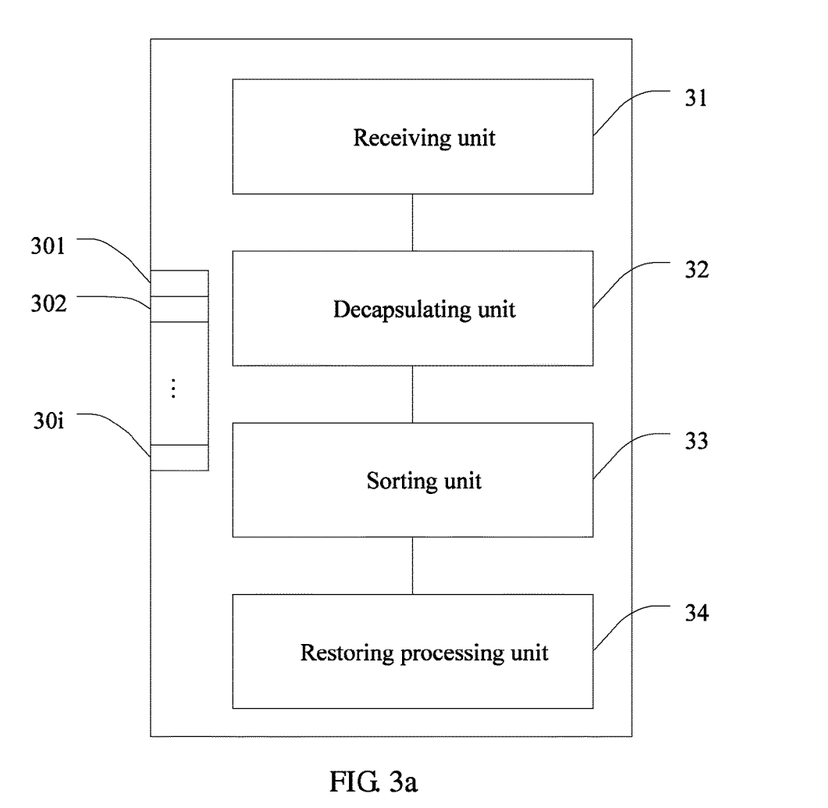
FIG. 3a is a fourth schematic structural diagram of a communications board according to an embodiment of the present invention.

Further, as shown in FIG. 3a, an Ethernet interface 30 of the communications board includes at least one Ethernet subinterface (Ethernet subinterfaces 301 and 302-30i in FIG. 3a, where i≥1 and i is a positive integer), each Ethernet subinterface has a unique MAC address, and the Ethernet subinterface of the communications board is connected to the TDM service switching module in the Ethernet switching chip; and the receiving unit is specifically configured to receive, from the Ethernet subinterface, each Ethernet frame sent by the TDM service switching module in the Ethernet switching chip.

For the communications board shown in FIG. 3, reference may be made to related description of the second communications board in the method shown in FIG. 1.

It should be noted that, a function of the communications board shown in FIG. 2 and a function of the communications board shown in FIG. 3 may be implemented by integrating them on a same communications board, and may also be implemented by using two independent communications boards respectively.

Figure 4:
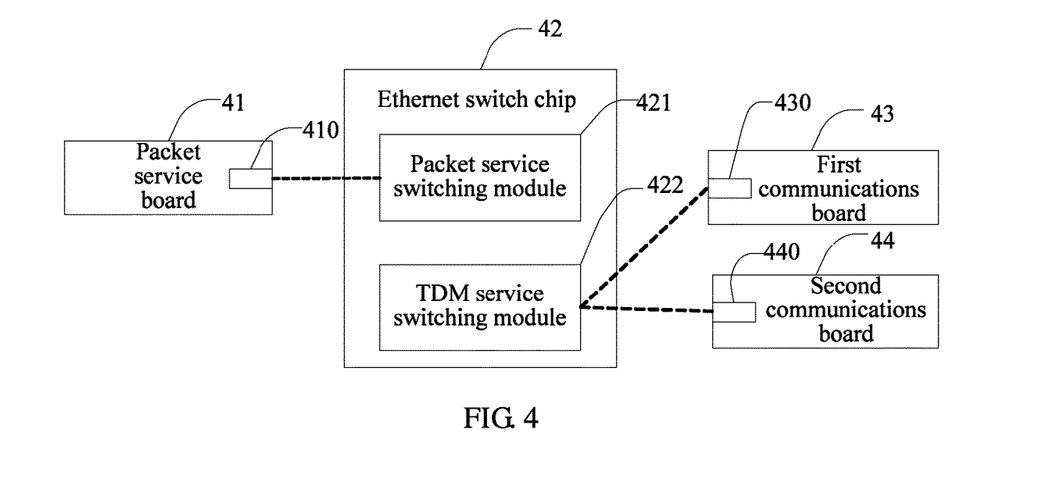
FIG. 4 is a schematic structural diagram of a data switching device according to an embodiment of the present invention.

As shown in FIG. 4, an embodiment of the present invention provides a data switching device, where the data switching device includes:

a packet service board 41 that has an Ethernet interface 410;

a first communications board 43 that has an Ethernet interface 430;

a second communications board 44 that has an Ethernet interface 440; and an Ethernet switching chip 42 that includes a packet service switching module 421 and a time division multiplexing TDM service switching module 422, where the packet service switching module 421 is connected to the Ethernet interface 410 of the packet service board, and the TDM service switching module 422 is connected to the Ethernet interface 430 of the first communications board and the Ethernet interface 440 of the second communications board; where the packet service board 41 is configured to send packet service data to the packet service switching module, or receive packet service data sent by the packet service switching module, or perform processing on the packet service data;

the packet service switching module in the Ethernet switching chip 42 is configured to receive the packet service data sent by the packet service board, and send the packet service data to a target packet service board;

the first communications board 43 is configured to acquire an optical channel data unit ODU data flow; perform slicing processing on the ODU data flow according to a fixed frame frequency, so as to obtain various slices, where each slice includes a section of continuous ODU data in the ODU data flow; separately encapsulate each slice into an Ethernet frame, where the Ethernet frame carries at least a destination Media Access Control MAC address and a payload area, where the destination MAC address directs to the second communications board and the payload area is used to store the ODU data in a slice and a serial number of the slice; and send each Ethernet frame to the TDM service switching module;

the TDM service switching module 421 in the Ethernet switching chip is configured to receive each Ethernet frame sent by the first communications board and send each Ethernet frame to the second communications board to which the destination MAC address carried in the Ethernet frame directs; and the second communications board 44 is configured to receive each Ethernet frame sent by the TDM service switching module in the Ethernet switching chip; decapsulate Ethernet frames to obtain the serial numbers of the slices and the ODU data in the slices; sequentially arrange the ODU data in the slices according to the serial numbers of the slices; and restore the sequentially arranged ODU data in the slices to an ODU data flow according to a fixed frame frequency, where the fixed frame frequency is a fixed frame frequency adopted in slicing processing.

In a data switching device provided in this embodiment, after acquiring an ODU data flow, a first communications board performs slicing processing on the ODU data flow according to a fixed frame frequency, so as to obtain various slices; separately encapsulates each slice into an Ethernet frame; and sends the Ethernet frame to a TDM service switching module in an Ethernet switching chip, so that the TDM service switching module can send each Ethernet frame to a second communications board to which a destination MAC address carried in the Ethernet frame directs. After receiving the Ethernet frame, the second communications board can obtain ODU data by means of restoration, thereby completing switching of the ODU data between the first communications board and the second communications board.

Because the ODU data flow carries TDM service data, switching of the ODU data flow from the first communications board to the second communications board is independently performed by using the TDM service switching module in the Ethernet switching chip, and switching of a packet service is performed by using a packet service switching module in the Ethernet switching chip. Because a transmission delay of a TDM service is relatively small, when the TDM service switching module in the Ethernet switching chip switches the TDM service data to the second communications board, the TDM service is not affected by a transmission delay of the packet service. In this way, time required for switching the TDM service is shortened and the transmission delay of the TDM service is further decreased when the packet service and the TDM service are switched on a same switching device.

Further, the Ethernet interface of the first communications board 43 includes at least one Ethernet subinterface, each Ethernet subinterface has a unique MAC address, and the Ethernet subinterface is connected to the TDM service switching module in the Ethernet switching chip; and the first communications board 43 is specifically configured to send each Ethernet frame to the TDM service switching module in the Ethernet switching chip through the at least one Ethernet subinterface.

The Ethernet interface of the second communications board 44 includes at least one Ethernet subinterface, each Ethernet subinterface has a unique MAC address, and the Ethernet subinterface is connected to the TDM service switching module in the Ethernet switching chip; and the second communications board 44 is specifically configured to receive, from the Ethernet subinterface, each Ethernet frame sent by the TDM service switching module in the Ethernet switching chip.

Further, the first communications board 43 is a TDM service board that has a TDM service processing module or an OTN line board that has a TDM service processing module; and the second communications board 44 is a TDM service board that has a TDM service processing module or an OTN line board that has a TDM service processing module.

Figure 5:
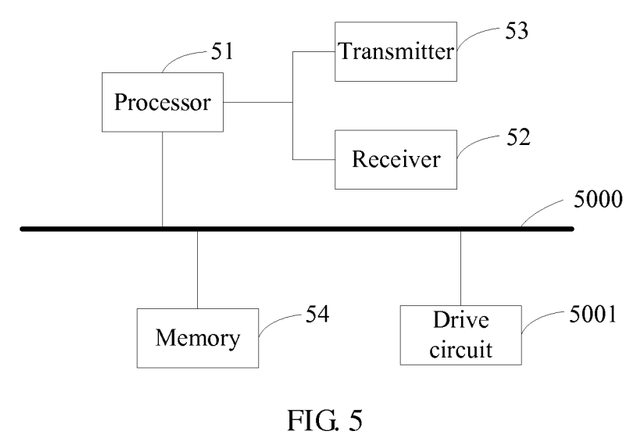
FIG. 5 is a fifth schematic structural diagram of a communications board according to an embodiment of the present invention.

As shown in FIG. 5, an embodiment of the present invention provides a communications board, where the communications board includes: a processor 51, a receiver 52, a transmitter 53, a memory 54, a bus 5000, and a drive circuit 5001.

The receiver 52 is configured to acquire an optical channel data unit ODU data flow.

The processor 51 is configured to perform slicing processing on the ODU data flow according to a fixed frame frequency, so as to obtain various slices, where each slice includes a section of continuous ODU data in the ODU data flow.

The processor 51 is further configured to separately encapsulate each slice into an Ethernet frame, where the Ethernet frame carries at least a destination Media Access Control MAC address and a payload area, where the destination MAC address directs to a second communications board and the payload area is used to store the ODU data in the slice and a serial number of the slice.

The transmitter 53 is configured to send each Ethernet frame to a time division multiplexing TDM service switching module in an Ethernet switching chip, so that the TDM service switching module sends each Ethernet frame to the second communications board to which the destination MAC address carried in the Ethernet frame directs, where the Ethernet switching chip further includes a packet service switching module that is configured to perform switching processing on a packet service.

The memory 54 is configured to temporarily store each slice or Ethernet frame.

In this embodiment, after acquiring an ODU data flow, a communications board performs slicing processing on the ODU data flow according to a fixed frame frequency, so as to obtain various slices; separately encapsulates each slice into an Ethernet frame; and sends the Ethernet frame to a TDM service switching module in an Ethernet switching chip, so that the TDM service switching module can send each Ethernet frame to a second communications board to which a destination MAC address carried in the Ethernet frame directs. After receiving the Ethernet frame, the second communications board can obtain ODU data by means of restoration, thereby completing switching of the ODU data from the communications board to the Ethernet switching chip.

It should be noted that, the receiver 52 and the transmitter 53 may be coupled to an antenna.

The drive circuit 5001 is configured to provide a driver for each hardware in the communications board, so that each hardware can normally work.

In specific implementation of this embodiment, the memory includes at least one or more of the following memories: a read-only memory, a random access memory, and a nonvolatile random access memory. The memory provides instructions and data for the processor.

The processor may be an integrated circuit chip and has a signal processing capability. In an implementation process, each step in the foregoing methods may be completed by means of an integrated logic circuit of hardware in the processor or instructions in a form of software. The instructions may be implemented and controlled in cooperation with the processor and is used to perform the methods disclosed by the embodiments of the present invention. The foregoing processor may also be a general processor, a digital signal processor (Digital Signal Processing, DSP), an application-specific integrated circuit (Application Specific Integrated Circuit, ASIC), a field programmable gate array (Field Programmable Gate Array, FPGA) or another programmable logic component, a discrete gate or a transistor logic component, or a discrete hardware component.

The foregoing general processor may be a microprocessor, or the processor may also be any conventional processor, decoder, or the like. The steps of the methods disclosed in the embodiments of the present invention may be directly executed by a hardware processor, or executed by a combination of hardware and software modules in a processor. The software module may be located in a mature storage medium in the art, such as a random access memory, a flash memory, a read-only memory, a programmable read-only memory or an electrically erasable programmable memory, or a register.

In addition, all hardware components of the communications board are coupled together by using a bus system 5000, where the bus system 5000 may further include a power bus, a control bus, and a status signal bus in addition to a data bus. However, for clarity of description, various buses are marked as the bus system 5000 in FIG. 5.

Further, an Ethernet interface of the communications board includes at least one Ethernet subinterface, each Ethernet subinterface has a unique MAC address, and the Ethernet subinterface of the communications board is connected to the TDM service switching module in the Ethernet switching chip.

The transmitter 53 is specifically configured to send each Ethernet frame to the TDM service switching module in the Ethernet switching chip through the at least one Ethernet subinterface.

Further, the communications board is a TDM service board that has a TDM service processing module or an OTN line board that has a TDM service processing module.

Figure 6:
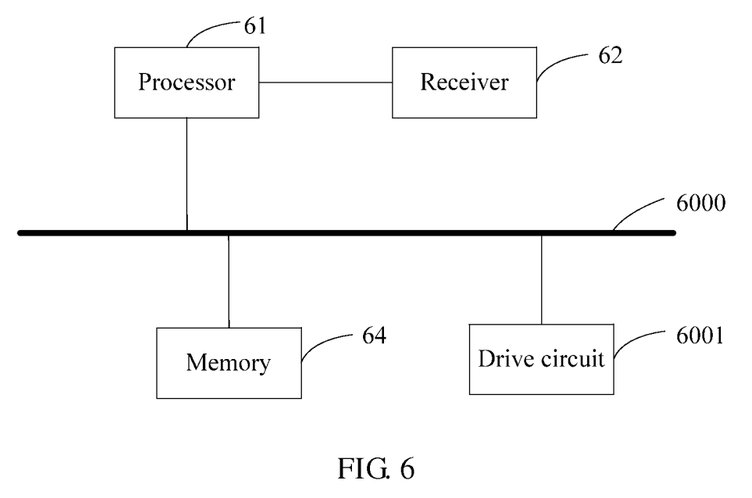
FIG. 6 is a sixth schematic structural diagram of a communications board according to an embodiment of the present invention.

As shown in FIG. 6, an embodiment of the present invention further provides a communications board, where the communications board includes: a processor 61, a receiver 62, a memory 64, a bus 6000, and a drive circuit 6001.

The receiver 62 is configured to receive each Ethernet frame sent by a time division multiplexing TDM service switching module in an Ethernet switching chip, where the Ethernet frame carries at least a destination Media Access Control MAC address and a payload area, where the destination MAC address directs to a second communications board and the payload area is used to store optical channel data unit ODU data in a slice and a serial number of the slice.

The processor 61 is configured to decapsulate Ethernet frames to obtain the serial numbers of the slices and the ODU data in the slices.

The processor 61 is further configured to sequentially arrange the ODU data in the slices according to the serial numbers of the slices.

The processor 61 is further configured to restore the sequentially arranged ODU data in the slices to an ODU data flow according to a fixed frame frequency, where the fixed frame frequency is a fixed frame frequency adopted in slicing processing.

The memory 64 is configured to temporarily store the ODU data in each Ethernet frame or slice.

In this embodiment, after receiving an Ethernet frame sent by a TDM service switching module in an Ethernet switching chip, a communications board decapsulates Ethernet frames to obtain serial numbers of the slices and ODU data in the slices, sequentially arranges the ODU data in the slices according to the serial numbers of the slices, and then restores the sequentially arranged ODU data in the slices to an ODU data flow according to a fixed frame frequency, thereby completing switching of the ODU data from the Ethernet switching chip to the communications board.

It should be noted that, the receiver 62 may be coupled to an antenna.

The drive circuit 6001 is configured to provide a driver for each hardware in the communications board, so that each hardware can normally work.

In specific implementation of this embodiment, the memory includes at least one or more of the following memory devices: a read-only memory, a random access memory, or a nonvolatile random access memory. The memory provides instructions and data for the processor.

The processor may be an integrated circuit chip and has a signal processing capability. In an implementation process, each step in the foregoing methods may be completed by means of an integrated logic circuit of hardware in the processor or instructions in a form of software.

The instructions may be implemented and controlled in cooperation with the processor and is used to perform the methods disclosed by the embodiments of the present invention. The foregoing processor may also be a general processor, a digital signal processor (Digital Signal Processing, DSP), an application-specific integrated circuit (application specific integrated circuit), a field programmable gate array (Field Programmable Gate Array, FPGA) or another programmable logic component, a discrete gate or a transistor logic component, or a discrete hardware component.

The foregoing general processor may be a microprocessor, or the processor may also be any conventional processor, decoder, or the like. The steps of the methods disclosed in the embodiments of the present invention may be directly executed by a hardware processor, or executed by a combination of hardware and software modules in a processor. The software module may be located in a mature storage medium in the art, such as a random access memory, a flash memory, a read-only memory, a programmable read-only memory or an electrically erasable programmable memory, or a register.

In addition, all hardware components of the communications board are coupled together by using a bus system 6000, where the bus system 6000 may further include a power bus, a control bus, and a status signal bus in addition to a data bus. However, for clarity of description, various buses are marked as the bus system 6000 in FIG. 6.

Further, an Ethernet interface of the communications board includes at least one Ethernet subinterface, each Ethernet subinterface has a unique MAC address, and the Ethernet subinterface of the communications board is connected to the TDM service switching module in the Ethernet switching chip.

The receiver 62 is specifically configured to receive, from the Ethernet subinterface, each Ethernet frame sent by the TDM service switching module in the Ethernet switching chip.

Further, the communications board is a TDM service board that has a TDM service processing module or an OTN line board that has a TDM service processing module.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data switching device, comprising:
a packet service board having an Ethernet interface;
a first communications board and a second communications board, each of which has an Ethernet interface; and
an Ethernet switching chip comprising a packet service switching module and a time division multiplexing (TDM) service switching module, wherein the packet service switching module is connected to the Ethernet interface of the packet service board, and the TDM service switching module is connected to the Ethernet interfaces of the first communications board and the second communications board;
wherein the packet service board is configured to perform at least one of send packet service data to the packet service switching module, receive packet service data sent by the packet service switching module, or perform processing on packet service data;
wherein the packet service switching module in the Ethernet switching chip is configured to receive packet service data sent by the packet service board, and send the packet service data to a target packet service board;
wherein the first communications board is configured to acquire an optical channel data unit (ODU) data flow, perform slicing processing on the ODU data flow according to a fixed frame frequency so as to obtain slices of ODU data, encapsulate each slice of the ODU data into an Ethernet frame, and send each Ethernet frame to the TDM service switching module;
wherein each Ethernet frame carries a destination Media Access Control (MAC) address and a payload area, and wherein the destination MAC address directs to the second communications board and the payload area is used to store a slice of ODU data and a serial number of the slice of the ODU data;
wherein the TDM service switching module in the Ethernet switching chip is configured to receive Ethernet frames sent by the first communications board and send the Ethernet frames to the second communications board to which the destination MAC address carried in the Ethernet frame directs;
wherein the second communications board is configured to receive Ethernet frames sent by the TDM service switching module in the Ethernet switching chip, decapsulate Ethernet frames to obtain the serial numbers of the slices of the ODU data and the slices of ODU data, sequentially arrange the slices of ODU data according to the serial numbers of the slices of the ODU data, and restore the sequentially arranged the slices of ODU data to form an ODU data flow according to a fixed frame frequency; and
wherein the fixed frame frequency is a fixed frame frequency adopted in slicing processing.

2. The data switching device according to claim 1, wherein the Ethernet interface of the first communications board comprises at least one Ethernet subinterface, wherein each Ethernet subinterface has a unique MAC address, and wherein the Ethernet subinterface is connected to the TDM service switching module in the Ethernet switching chip; and
wherein the first communications board is specifically configured to send each Ethernet frame to the TDM service switching module in the Ethernet switching chip through the at least one Ethernet subinterface.

3. The data switching device according to claim 1, wherein the Ethernet interface of the second communications board comprises at least one Ethernet subinterface, wherein each Ethernet subinterface has a unique MAC address, and wherein the Ethernet subinterface is connected to the TDM service switching module in the Ethernet switching chip; and
wherein the second communications board is further configured to receive, from the Ethernet subinterface, each Ethernet frame sent by the TDM service switching module in the Ethernet switching chip.

4. The data switching device according to claim 1, wherein the first communications board is a TDM service board that has a TDM service processing module or an optical transport network (OTN) line board that has a TDM service processing module; and
the second communications board is a TDM service board that has a TDM service processing module or an OTN line board that has a TDM service processing module.

* * * * *